US009091562B2

(12) United States Patent
Bell et al.

(10) Patent No.: US 9,091,562 B2
(45) Date of Patent: Jul. 28, 2015

(54) NAVIGATION SYSTEM EFFICIENTLY UTILIZES POWER BY PROVIDING INSTRUCTIONS TO THE DRIVER FOR ONLY THE DRIVER SELECTED PORTION(S) OF ROUTE

(75) Inventors: Denise A. Bell, Austin, TX (US); Travis M. Grigsby, Austin, TX (US); Jana H. Jenkins, Raleigh, NC (US); Trevor Livingston, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 7 days.

(21) Appl. No.: 13/535,227

(22) Filed: Jun. 27, 2012

(65) Prior Publication Data

US 2014/0005926 A1    Jan. 2, 2014

(51) Int. Cl.
*G01C 21/36* (2006.01)

(52) U.S. Cl.
CPC ............ *G01C 21/36* (2013.01); *G01C 21/3641* (2013.01)

(58) Field of Classification Search
CPC ........ G01C 21/26; G01C 21/34; G01C 21/36; G01C 21/3407; G01C 21/3667; G01C 21/3641
USPC ................................................. 701/400, 425
See application file for complete search history.

(56) References Cited

U.S. PATENT DOCUMENTS

| | | | | |
|---|---|---|---|---|
| 6,059,843 A * | 5/2000 | Kirkhart | | 701/490 |
| 7,480,567 B2 * | 1/2009 | Suomela et al. | | 701/428 |
| 7,904,238 B2 * | 3/2011 | Nesbitt | | 701/420 |
| 8,170,790 B2 * | 5/2012 | Lee et al. | | 701/400 |
| 8,260,541 B2 * | 9/2012 | Suzuki | | 701/400 |
| 8,312,477 B2 * | 11/2012 | Lin | | 719/319 |
| 2004/0122588 A1 * | 6/2004 | Ito et al. | | 701/207 |
| 2005/0033512 A1 * | 2/2005 | Skarine | | 701/211 |
| 2006/0085121 A1 * | 4/2006 | Jeong | | 701/200 |
| 2007/0067097 A1 * | 3/2007 | Haatainen | | 701/208 |
| 2007/0265774 A1 * | 11/2007 | Deurwaarder et al. | | 701/211 |
| 2008/0114535 A1 * | 5/2008 | Nesbitt | | 701/202 |
| 2008/0167797 A1 * | 7/2008 | Geelen et al. | | 701/200 |
| 2009/0113296 A1 * | 4/2009 | Lacy et al. | | 715/700 |
| 2009/0164115 A1 * | 6/2009 | Kosakowski et al. | | 701/201 |
| 2010/0289695 A1 * | 11/2010 | Kirmuss et al. | | 342/357.47 |
| 2010/0324816 A1 * | 12/2010 | Highstrom et al. | | 701/209 |
| 2011/0172917 A1 * | 7/2011 | Muzina et al. | | 701/212 |
| 2011/0191014 A1 * | 8/2011 | Feng et al. | | 701/200 |
| 2012/0221247 A1 * | 8/2012 | Aben et al. | | 701/537 |
| 2012/0284552 A1 * | 11/2012 | Archer et al. | | 713/324 |
| 2013/0024113 A1 * | 1/2013 | Weng et al. | | 701/455 |

* cited by examiner

*Primary Examiner* — Fadey Jabr
*Assistant Examiner* — Courtney Heinle
(74) *Attorney, Agent, or Firm* — Robert A. Voigt, Jr.; Winstead, P.C.

(57) ABSTRACT

A method, system and computer program product for conserving power in a GPS-based navigation system. The navigation system receives input from the driver selecting a portion(s) of the route (route from the current location of the vehicle to the destination) where the driver requests guidance. For those portions of the route not selected by the driver to receive guidance, the navigation system implements a low detail mode of operation. In such a mode of operation, the navigation system reduces its update frequency as well as displays less detailed graphics so as to consume less power. For those portions selected by the driver to receive guidance, the navigation system implements a high detail mode of operation, where the navigation system is capable of audiovisually communicating to the driver instructions for reaching a given destination. In this manner, the power consumed by the navigation system will be more efficiently utilized.

9 Claims, 5 Drawing Sheets

NAVIGATION SYSTEM EFFICIENTLY UTILIZES POWER BY PROVIDING INSTRUCTIONS TO THE DRIVER FOR ONLY THE DRIVER SELECTED PORTION(S) OF ROUTE

TECHNICAL FIELD

The present invention relates generally to vehicle-based Global Positioning Systems (GPS), and more particularly to a navigation system that efficiently utilizes power by providing instructions to the driver for only the driver selected portion(s) of the route that the driver requires guidance.

BACKGROUND

There is an increasing use of Global Positioning System (GPS)-based navigation systems in vehicles. Such navigation systems receive signals from an array of satellites which are part of the GPS. Based on received signals, GPS-based navigation systems may identify a vehicle's location in terms of latitude and longitude. The navigation system may also detect the vehicle's speed and direction of travel. With geographic information stored in an on-board computer in the vehicle, the navigation system is capable of audio-visually communicating to a user instructions for reaching a given destination.

For many users of GPS-based navigation systems, the route to be traveled may not be entirely unfamiliar. Hence, the user may not need instructions (audio/graphically) from the navigation system for the entire route. However, GPS-based navigation systems do not currently take into consideration whether the user only needs guidance for a portion of the route. As a result, the GPS-based navigation system unnecessarily uses power and provides instructions when it may not be necessary.

BRIEF SUMMARY

In one embodiment of the present invention, a method for conserving power in a GPS-based navigation system comprises receiving a destination from a driver of a vehicle. The method further comprises identifying a current location of the vehicle. Additionally, the method comprises determining a route to travel from the current location of the vehicle to the destination. Furthermore, the method comprises receiving input from the driver selecting a first portion of the route requiring the GPS-based navigation system to enter a high detail mode of operation. In addition, the method comprises implementing, by a processor, a low detail mode of operation on a second portion of the route in response to the driver not selecting the second portion of the route to require the GPS-based navigation system to enter the high detail mode of operation, where the low detail mode of operation consumes less power than the high detail mode of operation.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

The present invention comprises a method, system and computer program product for conserving power in a GPS-based navigation system. In one embodiment of the present invention, the navigation system receives a destination from the driver of the vehicle. Based on the current location of the vehicle, the navigation system determines the route to travel from the current location of the vehicle to the destination. The route may be presented to the driver in the form of a map on a display. The navigation system further receives input from the driver selecting a portion(s) of the route where the driver requests guidance. For those portions of the route not selected by the driver to receive guidance, the navigation system implements a low detail mode of operation. In such a mode of operation, the navigation system reduces its update frequency as well as displays less detailed graphics so as to consume less power. For those portions of the route selected by the driver to receive guidance, the navigation system implements a high detail mode of operation. The high detail mode of operation refers to the normal mode of operation which will only be used for those portions of the route that the driver requires guidance. In the normal mode of operation, the navigation system is capable of audio-visually communicating to the driver instructions for reaching a given destination. In this manner, the power consumed by the navigation system will be more efficiently utilized.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
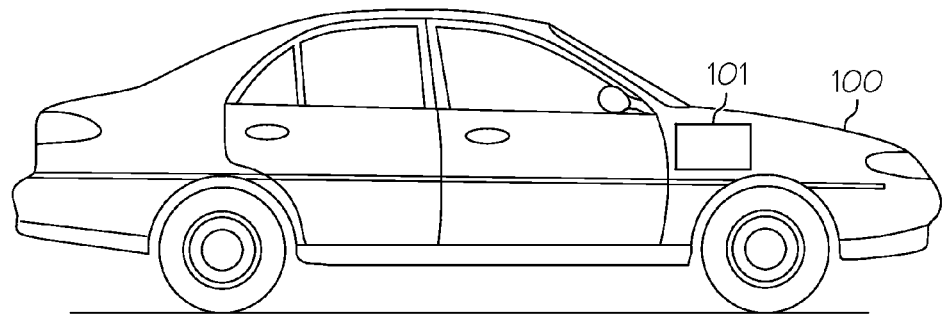
FIG. 1 illustrates a vehicle with a navigation system according to one embodiment of the present invention.

Referring now to the Figures in detail, FIG. 1 illustrates a vehicle 100 with a navigation system 101 according to one embodiment of the present invention. The basic navigation system 101 is shown in greater detail in FIG. 2.

Figure 2:
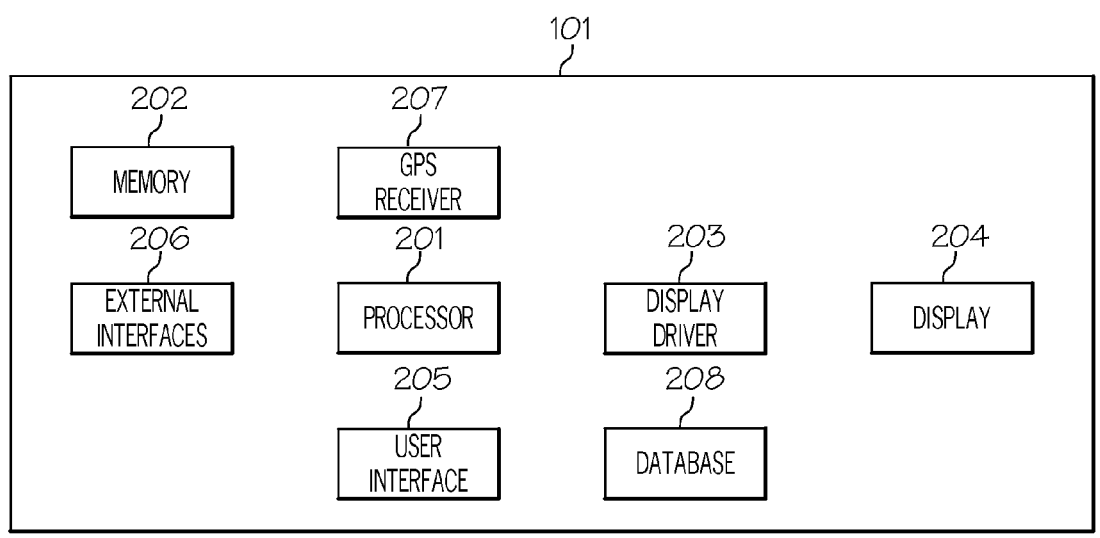
FIG. 2 illustrates an embodiment of the present invention of the navigation system.

FIG. 2 illustrates an embodiment of the present invention of navigation system 101 (FIG. 1). Referring to FIG. 2, navigation system 101 includes a processor 201, a memory 202, a display driver 203, a display 204, a user interface 205, external interfaces 206 and a Global Positioning System (GPS) receiver 207.

Memory 202 is used to store software and data for processor 201 to carry out various operations of navigation system 101. In this instance, the stored software may include a navigator web browser for browsing information provided, e.g., by servers connected to the Internet. In particular, the navigator browser works compatibly with the standard hypertext transfer protocol (HTTP), hypertext markup language (HTML), virtual reality markup language (VRML), graphics interchange format (GIF), JAVA applets, etc. In one embodiment, the stored software may further include an application for conserving power in the GPS-based navigation system 101 as discussed further below in connection with FIGS. 3-8.

Display 204 may include a conventional liquid crystal display (LCD). Through display driver 203, processor 201 controls the display of text and graphics on display 204 in a predetermined format. User interface 205 may comprise conventional audio circuitry including a microphone and speaker for the user to communicate with navigation system 101 via audio media. User interface 205 may also comprise an indicator device, e.g., a mouse, touchpad, roller ball, or a combination thereof, which may enable a user to move a cursor on display 204 and to point and click at a displayed option or an icon to select same. In addition, user interface 204 may incorporate well-known touch-screen circuitry (not shown). With this circuitry, the user can interact with processor 201 by using a finger or a stylus to touch the surface of display 204, which is tactile-sensitive. Processor 201 receives from the touch screen circuitry a signal identifying the location on display 204 where it has been touched. If such a location matches the predetermined location of one of displayed options or icons, processor 201 determines that the option or icon has been selected. Otherwise, a cursor is placed at the touched location on display 204, prompting for an input from the user.

The user input may be realized using a virtual keyboard shown on display 204 also provided by the touch-screen circuitry. In a well known manner, characters are input by touching the corresponding keys on the virtual keyboard. Alternatively, processor 201 may be programmed to recognize handwritten characters, and may receive through the touch-screen circuitry images of characters drawn by the user on display 204. Any recognized characters corresponding to the drawn images then become the user input. Still alternatively, through one of external interfaces 206, navigation system 101 can be connected to a keyboard device or a personal computer (PC) having a keyboard for user input. In any of these manners, the user may input a destination to navigation system 101.

In one embodiment, navigation system 101 includes a database 208 that is configured to store map data that is used by navigation system 101 to provide driving directions to the driver of vehicle 100 to arrive at a destination from a current location of vehicle 100.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

As stated in the Background section, for many users of GPS-based navigation systems, the route to be traveled may not be entirely unfamiliar. Hence, the user may not need instructions (audio/graphically) from the navigation system for the entire route. However, GPS-based navigation systems do not currently take into consideration whether the user only needs guidance for a portion of the route. As a result, the GPS-based navigation system unnecessarily uses power and provides instructions when it may not be necessary.

Figure 3:
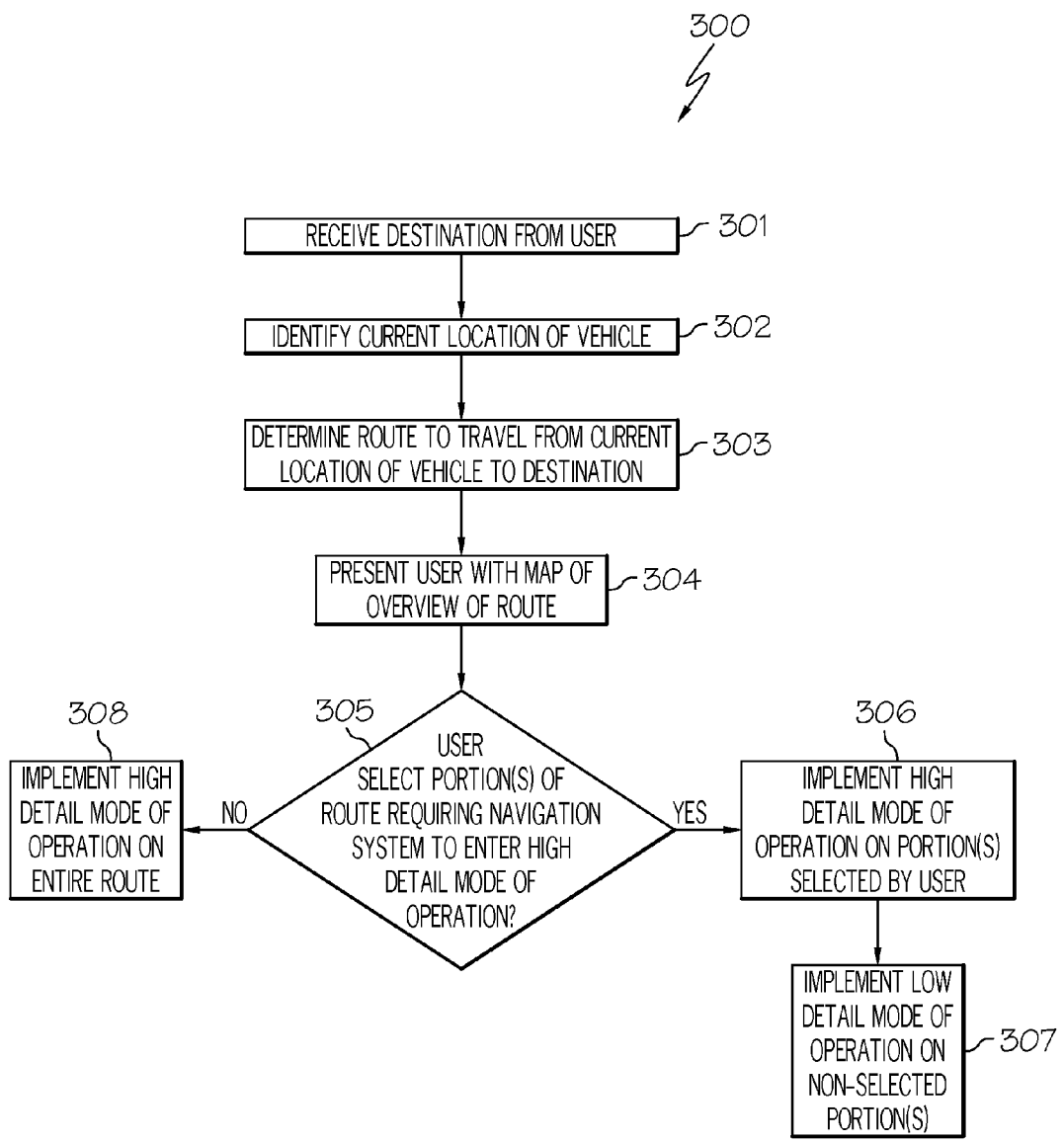
FIG. 3 is a flowchart of a method for conserving power in a GPS-based navigation system in accordance with an embodiment of the present invention.
Figure 4:
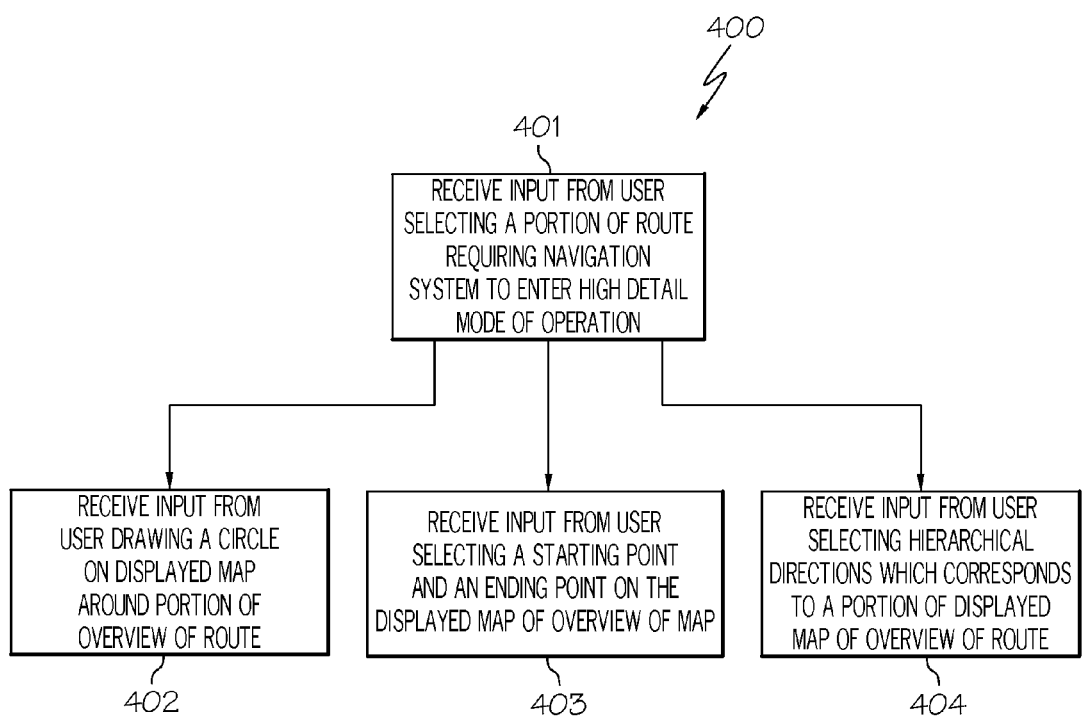
FIG. 4 is a flowchart of a method for selecting a portion of the route requiring the navigation system to enter the high detail mode of operation in accordance with an embodiment of the present invention.
Figure 5:
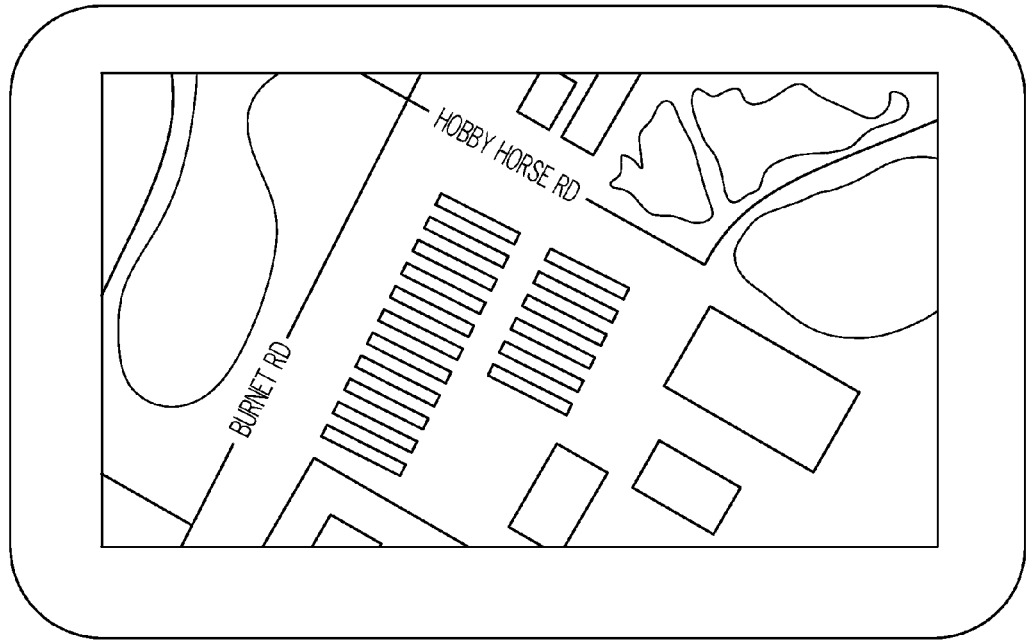
FIG. 5 illustrates a map displayed by the navigation system during the high detail mode of operation in accordance with an embodiment of the present invention.
Figure 6:
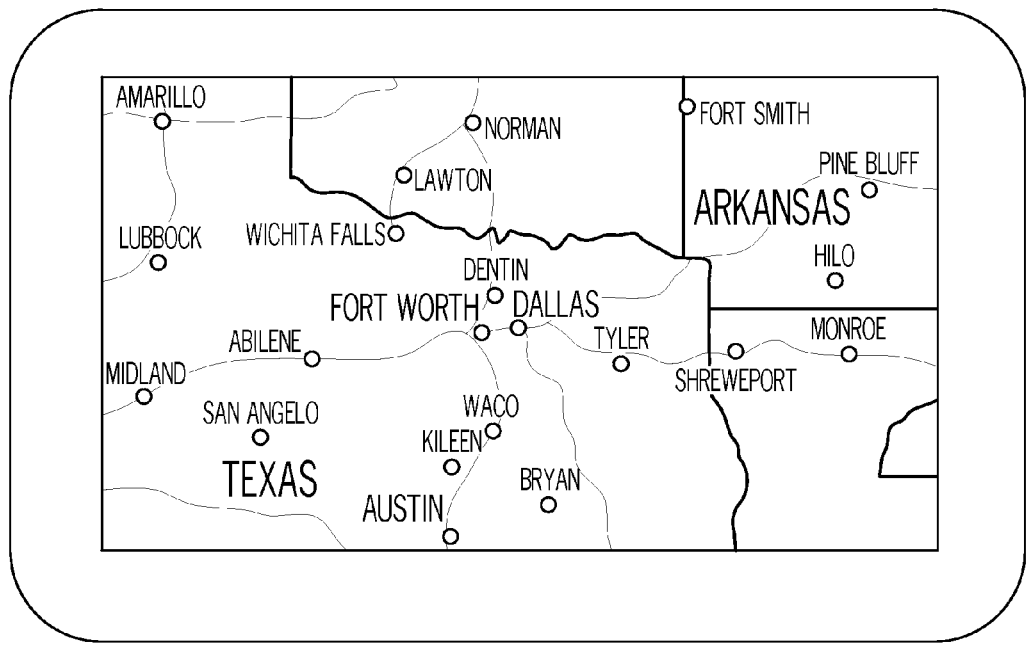
FIG. 6 illustrates a map displayed by the navigation system during the low detail mode of operation in accordance with an embodiment of the present invention.
Figure 7:
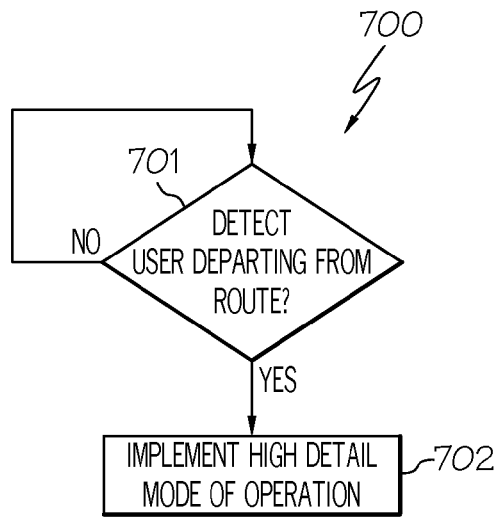
FIG. 7 is a flowchart of a method for switching to the high detail mode of operation while operating in the low detail mode of operation.
Figure 8:
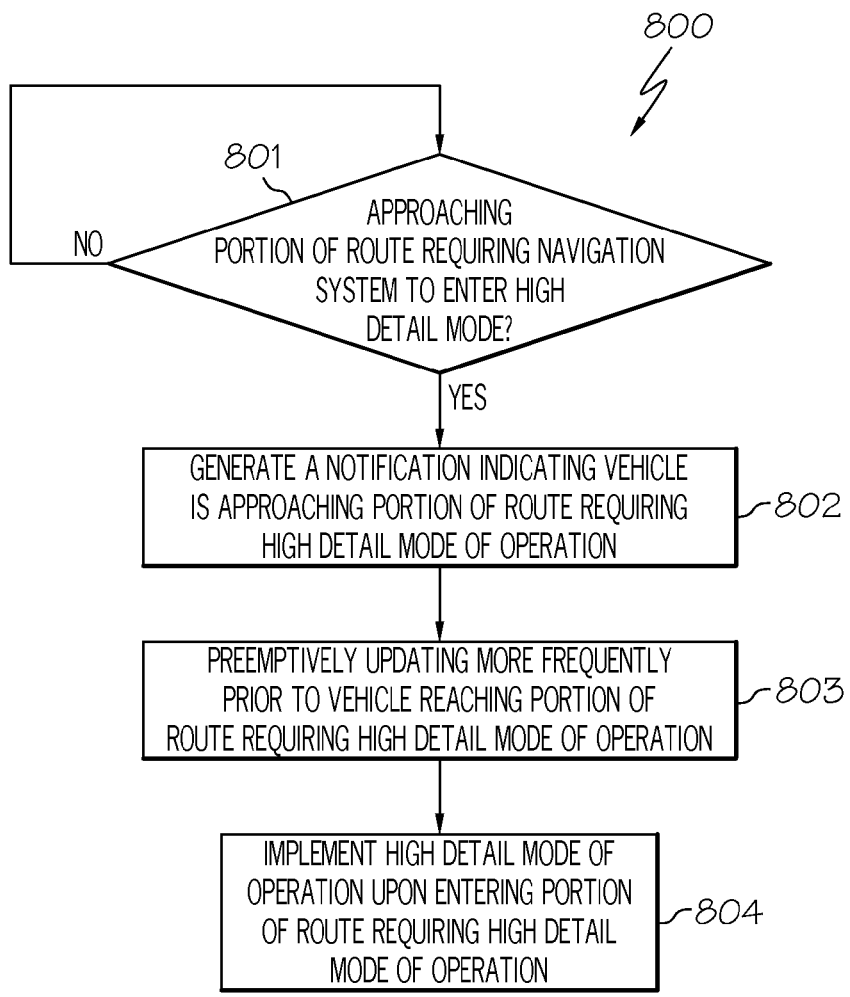
FIG. 8 is a flowchart of a method for implementing the high detail mode of operation as the driver approaches the portion of the route designated by the driver to require guidance.

The principles of the present invention provide a means for conserving power in the GPS-based navigation system by having two modes of operation, a low detail mode of operation and a high detail mode of operation. The low detail mode of operation is implemented when the driver does not require guidance. In such a mode of operation, the GPS-based navigation system reduces its update frequency as well as displays less detailed graphics so as to consume less power. The high detail mode of operation refers to the normal mode of operation which will only be used for those portions of the route that the driver requires guidance. In the normal mode of operation, the navigation system is capable of audio-visually communicating to the driver instructions for reaching a given destination. In this manner, the power consumed by the GPS-based navigation system will be more efficiently utilized. A discussion of the present invention providing a means for conserving power in the GPS-based navigation system is discussed further below in connection with FIGS. 3-8. FIG. 3 is a flowchart of a method for conserving power in GPS-based navigation system 101 (FIGS. 1 and 2). FIG. 4 is a flowchart of a method for selecting a portion of the route requiring navigation system 101 to enter the high detail mode of operation. FIG. 5 illustrates a map displayed by navigation system 101 during the high detail mode of operation. FIG. 6 illustrates a map displayed by navigation system 101 during the low detail mode of operation. FIG. 7 is a flowchart of a method for switching to the high detail mode of operation while operating in the low detail mode of operation. FIG. 8 is a flowchart of a method for implementing the high detail mode of operation as the driver approaches the portion of the route designated by the driver to require guidance (i.e., the portion of the route designated by the driver where navigation system 101 enters the high detail mode of operation).

As stated above, FIG. 3 is a flowchart of a method 300 for conserving power in GPS-based navigation system 101 (FIGS. 1 and 2) in accordance with an embodiment of the preset invention.

Referring to FIG. 3, in conjunction with FIGS. 1-2, navigation system 101 receives a destination from the driver of vehicle 100. For example, the user may input the destination by using a virtual keyboard shown on display 204.

In step 302, navigation system 101 identifies the current location of vehicle 100 using the received signals from an array of satellites which are part of the GPS.

In step 303, navigation system 101 determines the route to travel from the current location of vehicle 100 to the destination based on map data (e.g., map data stored in database 208).

In step 304, navigation system 101 presents to the driver a map of an overview of the route (determined in step 303) on display 204.

In step 305, a determination is made by navigation system 101 as to whether the driver selects portion(s) of the route requiring navigation system 101 to enter the high detail mode of operation. The driver of vehicle 100 may indicate to navigation system 101 in various ways as to which portion(s) of the route the driver would like to receive guidance as discussed below in connection with FIG. 4.

FIG. 4 is a flowchart of a method 400 for selecting a portion of the route requiring navigation system 101 to enter the high detail mode of operation in accordance with an embodiment of the present invention. While the following discusses the driver selecting a single portion of the route to receive guidance, the principles of the present invention are not be limited as such but instead are to include the driver selecting multiple portions of the route in the manners discussed below.

Referring to FIG. 4, in conjunction with FIGS. 1-3, in step 401, navigation system 101 receives input from the driver selecting a portion of the route (route determined in step 303) requiring navigation system 101 to enter the high detail mode of operation (i.e., the user selects a portion of the route to receive guidance). The driver selects a portion of the route using one of the manners discussed below.

In step 402, navigation system 101 receives input from the driver drawing a circle on the displayed map (displayed on display 204 in step 304) around the portion of the overview of the route the driver would like to receive guidance (i.e., around the portion of the route navigation system 101 is to implement the high detail mode of operation).

Alternatively, in step 403, navigation system 101 receives input from the driver selecting a starting point and an ending point on the displayed map (displayed on display 204 in step 304) designating the start and end points of the portion of the route the driver would like to receive guidance (i.e., the start and end points of the portion of the route navigation system 101 is to implement the high detail mode of operation).

Furthermore, in alternative to steps 402 and 403, in step 404, navigation system 101 receives input from the driver selecting hierarchical directions (driving directions displayed on display 204, such as in connection with the displayed map of route) corresponding to the portion of the overview of the route the driver would like to receive guidance (i.e., corresponding to the portion of the route navigation system 101 is to implement the high detail mode of operation). In one embodiment, these hierarchical directions may include directions for each portion of the route (route determined in step 303), and upon selecting one of these directions for a portion of the route, the selected directions may include additional directions for each portion of the selected portion of the route. For example, the driving directions from Detroit, Mich. to Chicago, Ill. may include driving directions from Detroit to Jackson, Mich.; driving directions from Jackson to Kalamazoo, Mich.; driving directions from Kalamazoo to St. Joseph, Mich.; and driving directions from St. Joseph to Chicago, Ill.

Upon selecting one of these directions, a further subset of directions for various portions of that route may appear. For example, upon selecting the driving directions from Detroit to Jackson, the driving directions from Detroit to Ann Arbor, Mich. and the driving direction from Ann Arbor to Jackson may appear.

In some implementations, method 400 may include other and/or additional steps that, for clarity, are not depicted. Further, in some implementations, method 400 may be executed in a different order presented and that the order presented in the discussion of FIG. 4 is illustrative. Additionally, in some implementations, certain steps in method 400 may be executed in a substantially simultaneous manner or may be omitted.

Returning to step 305 of FIG. 3, in conjunction with FIGS. 1-2, if the driver selects a portion(s) of the route to receive guidance (i.e., selects portion(s) of the route navigation system 101 is to implement the high detail mode of operation), then, in step 306, navigations system 101 implements the high detail mode of operation on those portion(s) of the route selected by the user. An example of a map displayed by navigation system 101 on display 204 during the high detail mode of operation is shown in FIG. 5 in accordance with an embodiment of the present invention. Returning to FIG. 3, in conjunction with FIGS. 1-2, in step 307, navigation system 101 implements the low detail mode of operation on those portion(s) of the route not selected by the user. An example of a map displayed by navigation system 101 on display 204 during the low detail mode of operation is shown in FIG. 6 in accordance with an embodiment of the present invention. In such a mode of operation, navigation system 101 reduces its update frequency as well as displays less detailed graphics so as to consume less power. Furthermore, in such a mode of operation, navigation system 101 may dim display 204 so as to consume less power. By implementing the high detail mode of operation only when the driver requires guidance, the power consumed by navigation system 101 will be more efficiently utilized.

If, however, the driver does not select any portion of the route to receive guidance (i.e., the driver does not select any portion of the route navigation system 101 is to implement the high detail mode of operation), then, in step 308, navigation system 101 implements the high detail mode of operation for the entire route by default.

In some implementations, method 300 may include other and/or additional steps that, for clarity, are not depicted. Further, in some implementations, method 300 may be executed in a different order presented and that the order presented in the discussion of FIG. 3 is illustrative. Additionally, in some implementations, certain steps in method 300 may be executed in a substantially simultaneous manner or may be omitted.

As discussed above, during the low detail mode of operation, navigation system 101 consumes less power. There are times though when navigation system 101 needs to switch to the high detail mode of operation while operating in the low detail mode of operation as discussed below in connection with FIG. 7.

FIG. 7 is a flowchart of a method 700 for switching to the high detail mode of operation while operating in the low detail mode of operation in accordance with an embodiment of the present invention.

Referring to FIG. 7, in conjunction with FIGS. 1-3, in step 701, a determination is made by navigation system 101 as to whether it detects the driver departing from the route (route determined in step 303) while operating in the low detail mode of operation.

If the navigation system 101 does not detect the driver departing from the route while operating in the low detail mode of operation, then navigation 101 continues to determine if it detects the driver departing from the route while operating in the low detail mode of operation in step 701.

If, however, navigation system 101 detects the driver departing from the route while operating in the low detail mode of operation in step 701, then, in step 702, navigation system 101 implements the high detail mode of operation.

In some implementations, method 700 may include other and/or additional steps that, for clarity, are not depicted. Further, in some implementations, method 700 may be executed in a different order presented and that the order presented in the discussion of FIG. 7 is illustrative. Additionally, in some implementations, certain steps in method 700 may be executed in a substantially simultaneous manner or may be omitted.

When switching from the low detail mode of operation to the high detail mode of operation, navigation system 101 may perform various actions as discussed below in connection with FIG. 8.

FIG. 8 is a flowchart of a method 800 for implementing the high detail mode of operation as the driver approaches (navigation system 101 is currently implementing the low detail mode of operation) the portion of the route designated by the driver to require guidance (i.e., the portion of the route designated by the driver where navigation system 101 enters the high detail mode of operation).

Referring to FIG. 8, in conjunction with FIGS. 1-3, in step 801, a determination is made by navigation system 101 as to whether vehicle 100 is approaching (navigation system 101 is currently operating in the low detail mode of operation) a portion of the route (route determined in step 303) that requires navigation system 101 to enter the high detail mode of operation. For example, when vehicle 100 is within a ½ mile from the portion of the route that requires navigation system 101 to enter the high detail mode of operation, then navigation system 101 is said to be "approaching" the portion of the route that requires navigation system 101 to enter the high detail mode of operation. "Approaching," as used herein, includes any amount of distance where such a distance is prior to entering the portion of the route that requires navigation system 101 to enter the high detail mode of operation and provides navigation system 101 with adequate time to perform steps 802-803.

If vehicle 100 is approaching a portion of the route that requires navigation system 101 to enter the high detail mode of operation, then, in step 802, navigation system 101 generates a notification indicating that vehicle 100 is approaching the portion of the route that requires the high detail mode of operation. Such a notification may be displayed on display 204 and/or presented as an audio instruction to the driver.

In step 803, navigation system 101 preemptively updates more frequently prior to vehicle 100 reaching the portion of the route that requires the high detail mode of operation. By navigation system 101 updating more frequently prior to vehicle 100 reaching the portion of the route that requires the high detail mode of operation, navigation system 101 should be able to accurately guide the driver immediately upon entering the portion of the route requiring the high detail mode of operation.

In step 804, navigation system 101 implements the high detail mode of operation upon entering the portion of the route requiring the high detail mode of operation.

In some implementations, method 800 may include other and/or additional steps that, for clarity, are not depicted. Further, in some implementations, method 800 may be executed in a different order presented and that the order presented in the discussion of FIG. 8 is illustrative. Additionally, in some implementations, certain steps in method 800 may be executed in a substantially simultaneous manner or may be omitted.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for conserving power in a GPS-based navigation system, the method comprising:
    receiving a destination from a driver of a vehicle;
    identifying a current location of said vehicle;
    determining a route to travel from said current location of said vehicle to said destination;
    presenting to said driver a map of an overview of said route on a display;
    receiving input from said driver selecting on said displayed map a first portion of said route requiring said GPS-based navigation system to enter a high detail mode of operation;
    implementing, by a processor, a low detail mode of operation on a second portion of said route in response to said driver not selecting said second portion of said route to require said GPS-based navigation system to enter said high detail mode of operation, wherein said low detail mode of operation consumes less power than said high detail mode of operation, wherein said low detail mode of operation comprises a reduction in update frequency for presenting information by said GPS-based navigation system in comparison to said high detail mode of operation, wherein said low detail mode of operation comprises dimming a screen and displaying less detailed graphics than displayed in comparison to said high detail mode of operation;
    generating a notification while said vehicle is in said second portion of said route indicating said vehicle is approaching said first portion of said route, wherein said notification is not an update for presenting information;
    preemptively updating more frequently the driver with navigation instructions while still in said low detail mode of operation by said GPS-based navigation system prior to said vehicle reaching said first portion of said route; and
    implementing said high detail mode of operation upon entering said first portion of said route.

2. The method as recited in claim 1, wherein said receiving of said input from said driver selecting said first portion of said route comprises one of the following:
    receiving an input from said driver drawing a circle on said displayed map around said first portion of said route; and
    receiving an input from said driver selecting a starting point and an ending point on said displayed map corresponding to said first portion of said route.

3. The method as recited in claim 1 further comprising:
    implementing said high detail mode of operation in response to said driver departing from said route while operating in said low detail mode of operation.

4. A computer program product embodied in a non-transitory computer readable storage medium for conserving power in a GPS-based navigation system, the computer program product comprising the programming instructions for:
    receiving a destination from a driver of a vehicle;
        identifying a current location of said vehicle;
        determining a route to travel from said current location of said vehicle to said destination;
    presenting to said driver a map of an overview of said route on a display;
        receiving input from said driver selecting on said displayed map a first portion of said route requiring said GPS-based navigation system to enter a high detail mode of operation;
        implementing a low detail mode of operation on a second portion of said route in response to said driver not selecting said second portion of said route to require said GPS-based navigation system to enter said high detail mode of operation, wherein said low detail mode of operation consumes less power than said high detail mode of operation, wherein said low detail mode of operation comprises a reduction in update frequency for presenting information by said GPS-based navigation system in comparison to said high detail mode of operation, wherein said low detail mode of operation comprises dimming a screen and displaying less detailed graphics than displayed in comparison to said high detail mode of operation;
        generating a notification while said vehicle is in said second portion of said route indicating said vehicle is approaching said first portion of said route, wherein said notification is not an update for presenting information;
        preemptively updating more frequently the driver with navigation instructions while still in said low detail mode of operation by said GPS-based navigation system prior to said vehicle reaching said first portion of said route; and
        implementing said high detail mode of operation upon entering said first portion of said route.

5. The computer program product as recited in claim 4, wherein the programming instructions for receiving said input from said driver selecting said first portion of said route comprises one of the following:
    receiving an input from said driver drawing a circle on said displayed map around said first portion of said route; and
    receiving an input from said driver selecting a starting point and an ending point on said displayed map corresponding to said first portion of said route.

6. The computer program product as recited in claim 4 further comprising the programming instructions for:
    implementing said high detail mode of operation in response to said driver departing from said route while operating in said low detail mode of operation.

7. A navigation system, comprising:
    a memory unit for storing a computer program for conserving power in a GPS-based navigation system; and
    a processor coupled to said memory unit, wherein said processor, responsive to said computer program, comprises:
    circuitry for receiving a destination from a driver of a vehicle;
        circuitry for identifying a current location of said vehicle;
        circuitry for determining a route to travel from said current location of said vehicle to said destination;

circuitry for presenting to said driver a map of an overview of said route on a display;

circuitry for receiving input from said driver selecting on said displayed map a first portion of said route requiring said GPS-based navigation system to enter a high detail mode of operation;

circuitry for implementing a low detail mode of operation on a second portion of said route in response to said driver not selecting said second portion of said route to require said GPS-based navigation system to enter said high detail mode of operation, wherein said low detail mode of operation consumes less power than said high detail mode of operation, wherein said low detail mode of operation comprises a reduction in update frequency for presenting information by said GPS-based navigation system in comparison to said high detail mode of operation, wherein said low detail mode of operation comprises dimming a screen and displaying less detailed graphics than displayed in comparison to said high detail mode of operation;

circuitry for generating a notification while said vehicle is in said second portion of said route indicating said vehicle is approaching said first portion of said route, wherein said notification is not an update for presenting information;

circuitry for preemptively updating more frequently the driver with navigation instructions while still in said low detail mode of operation by said GPS-based navigation system prior to said vehicle reaching said first portion of said route; and circuitry for implementing said high detail mode of operation upon entering said first portion of said route.

8. The navigation system as recited in claim 7, wherein the circuitry for receiving said input from said driver selecting said first portion of said route comprises one of the following:

circuitry for receiving an input from said driver drawing a circle on said displayed map around said first portion of said route; and circuitry for receiving an input from said driver selecting a starting point and an ending point on said displayed map corresponding to said first portion of said route.

9. The navigation system as recited in claim 7, wherein said processor further comprises:

circuitry for implementing said high detail mode of operation in response to said driver departing from said route while operating in said low detail mode of operation.

\* \* \* \* \*